Sept. 11, 1945.　　　J. H. CRUMBLE　　　2,384,536
FLOAT OPERATED MECHANISM
Filed June 9, 1944　　　3 Sheets-Sheet 1
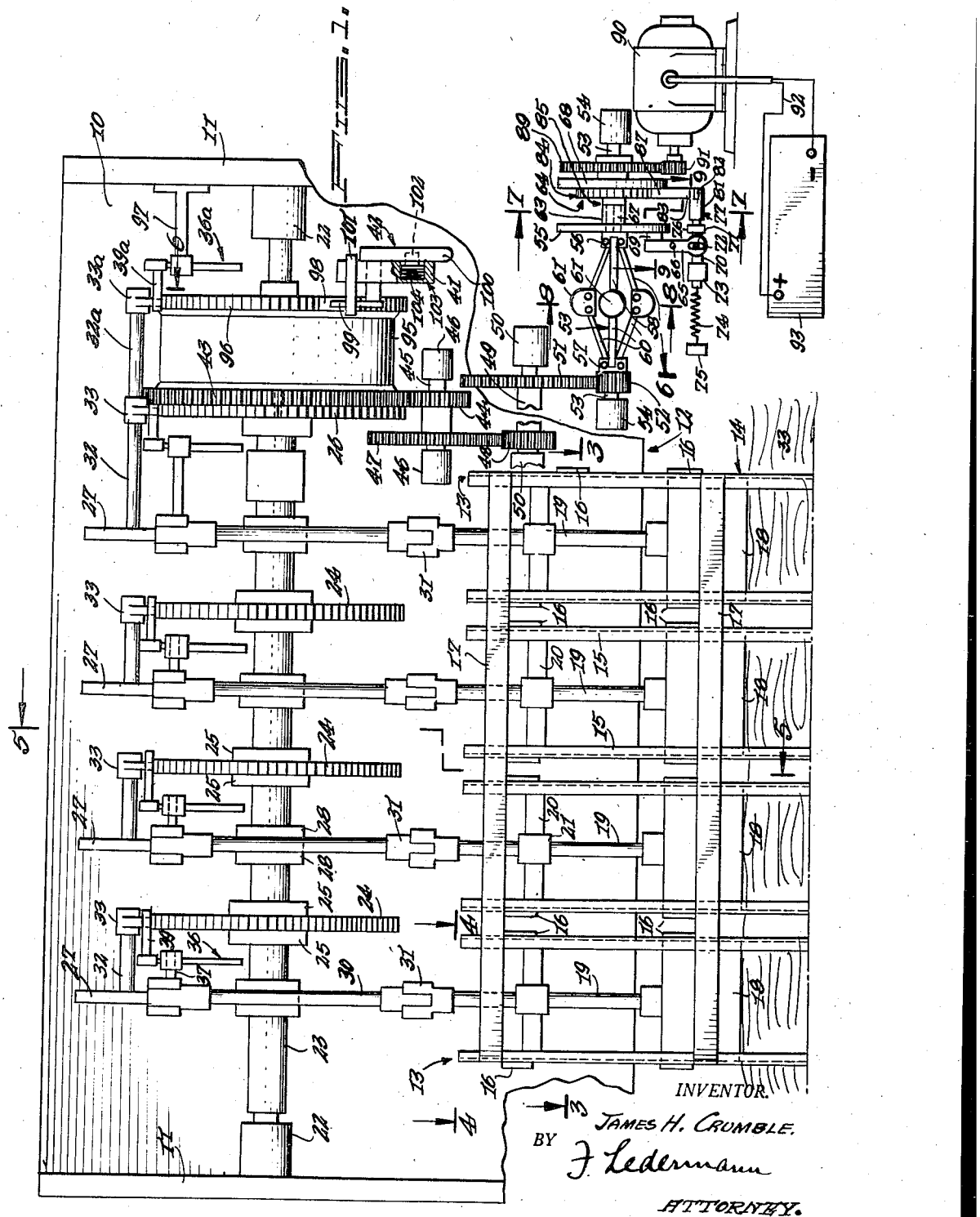
INVENTOR.
JAMES H. CRUMBLE,
BY J. Ledermann
ATTORNEY.

Sept. 11, 1945.   J. H. CRUMBLE   2,384,536
FLOAT OPERATED MECHANISM
Filed June 9, 1944   3 Sheets-Sheet 2
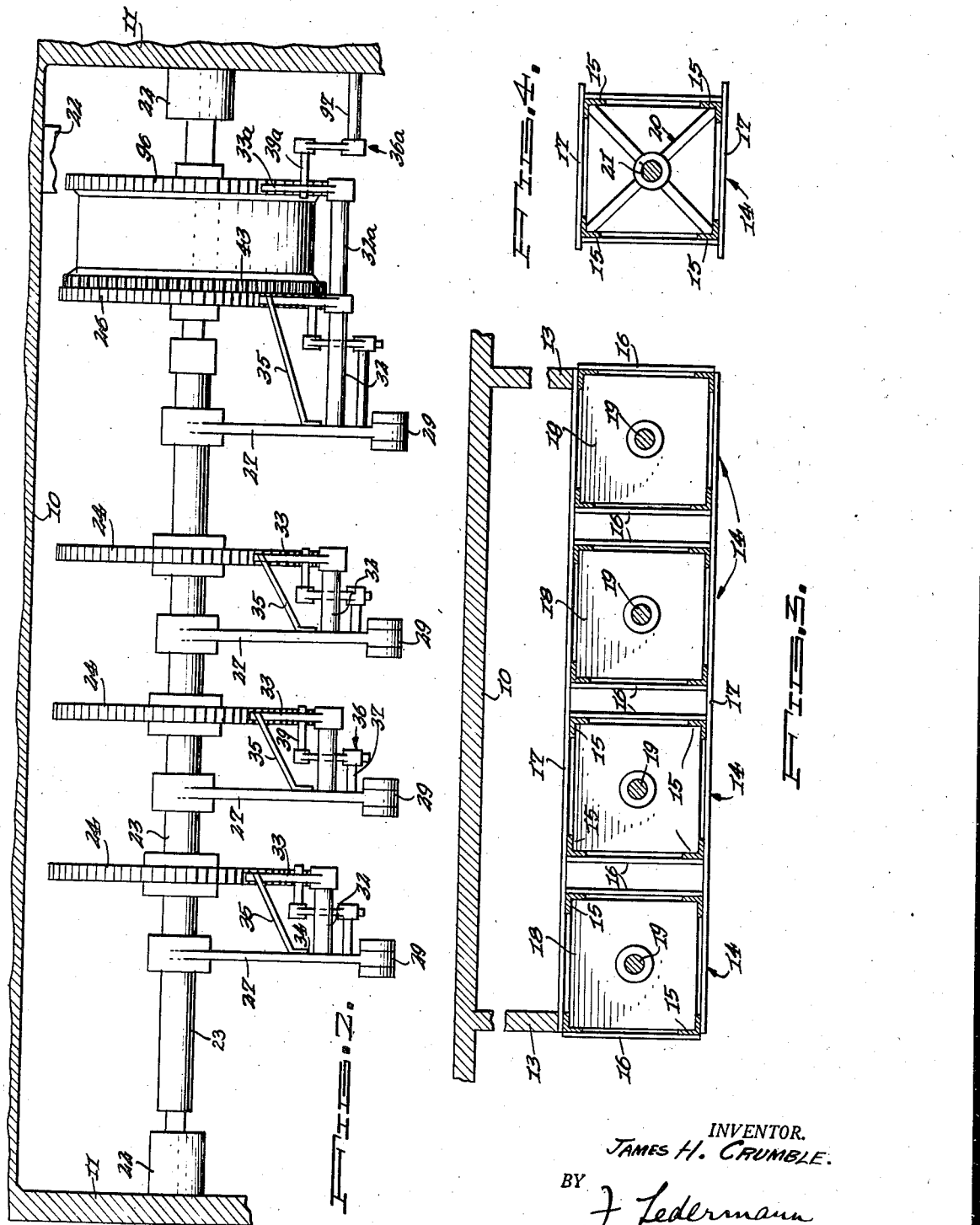
INVENTOR.
JAMES H. CRUMBLE.
BY
J. Ledermann
ATTORNEY.

Sept. 11, 1945. J. H. CRUMBLE 2,384,536
FLOAT OPERATED MECHANISM
Filed June 9, 1944 3 Sheets-Sheet 3
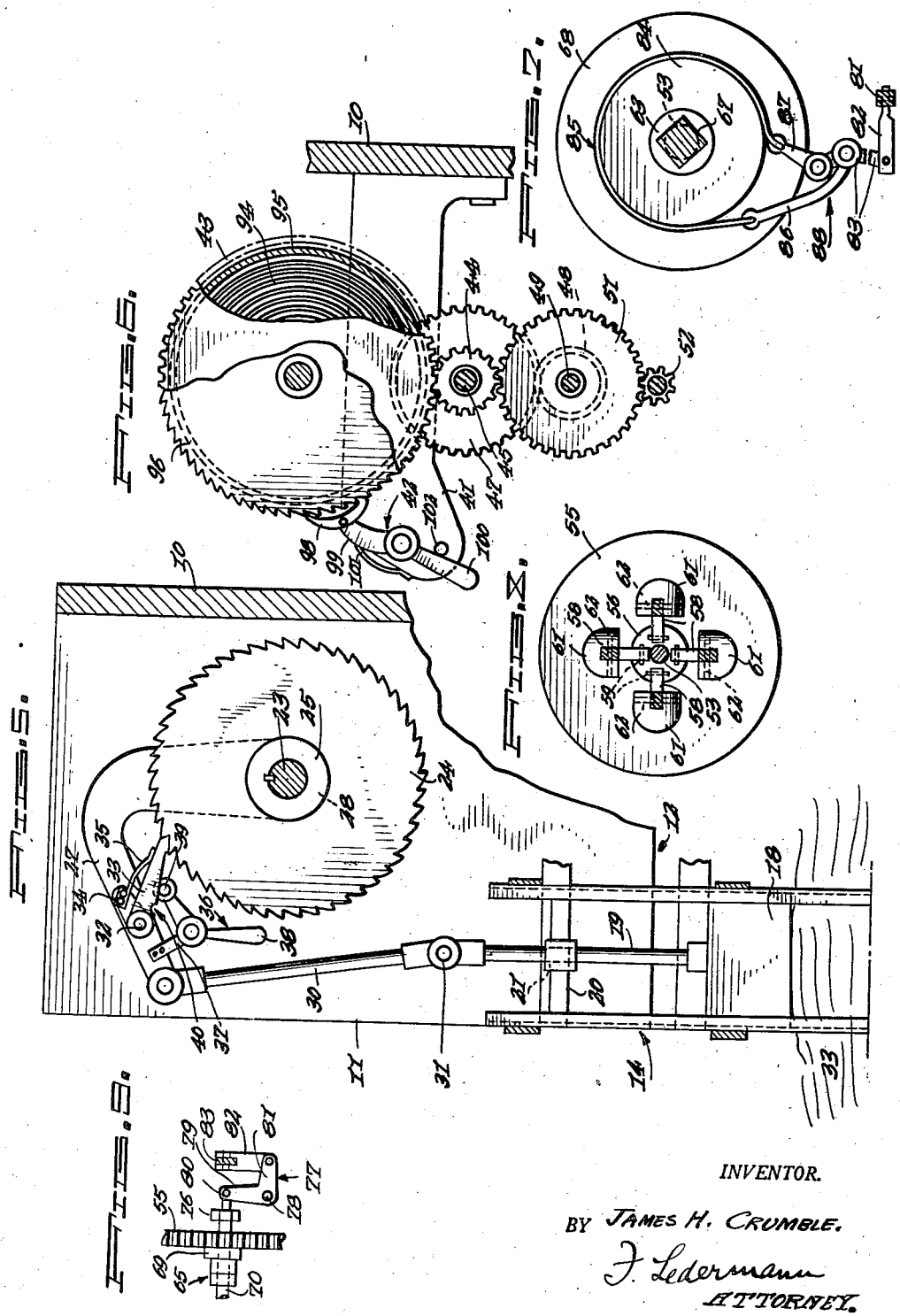
INVENTOR.
BY JAMES H. CRUMBLE.
F. Ledermann
ATTORNEY.

Patented Sept. 11, 1945

2,384,536

UNITED STATES PATENT OFFICE 2,384,536

FLOAT OPERATED MECHANISM

James H. Crumble, Brooklyn, N. Y.

Application June 9, 1944, Serial No. 539,421

4 Claims. (Cl. 253—10)

This invention relates to float operated machines, and more particularly to machines havings floats adapted to be alternately raised and lowered by the motion of the waves, whereby the power thus supplied by the waves is utilized.

One adaptation of the invention is for mounting at the sides of a ship close to the bow, or aft of the stern, so that the floats may be actuated by the waves which are formed at the sides of the bow or by the wake. Another adaptation would be for mounting on a dock or pier whereby the floats may be actuated by the usual wave motion of the water, or they could also be raised and lowered by the tidal rising and falling of the water.

One object of the invention is the provision of such a machine in the form of a battery of floats and float-operated mechanisms with means for taking off the total power thus developed by the battery.

Another object of the invention is the provision of means for storing up the continuous supply of energy created by the waves for use at a future time.

The above as well as other and related objects will become apparent in the description below, wherein characters of reference refer to likenamed parts in the accompanying drawings. It is to be noted that the drawings are intended to serve the purpose of illustration only, and that it is neither intended nor desired to limit the invention necessarily to the precise details of construction shown, excepting insofar as they may be deemed essential to the invention.

Referring briefly to the invention,

Fig. 1 is a front elevational view of the device and includes a wiring diagram.

Fig. 2 is a partial plan view of Fig. 1.

Fig. 3 is a cross-sectional view taken on the line 3—3 of Fig. 1.

Fig. 4 is a cross-sectional view taken on the line 4—4 of Fig. 1.

Fig. 5 is a view taken on the line 5—5 of Fig. 1.

Fig. 6 is an end view of Fig. 1, with parts broken away, taken on the line 6—6 of Fig. 1.

Fig. 7 is a sectional view taken on the line 7—7 of Fig. 1.

Fig. 8 is a cross-sectional view taken on the line 8—8 of Fig. 1.

Fig. 9 is a cross-sectional view taken on the line 9—9 of Fig. 1.

Referring in detail to the drawings, the numeral 10 indicates an upright rear frame wall having two end wing walls 11 at right angles thereto, these walls constituting the frame of the machine. Both the rear wall 10 and the side walls 11 extend downward to the line 12. Near the bottom of the wall 10, a pair of spaced walls or brackets 13 extend at right angles from the wall 10.

A battery or plurality of vertical guide cages 14, serving a purpose similar to that of a cylinder for a piston, are each formed of four corner angle irons 15 held together by side slats or the like 16 and elongated longitudinal slats 17, the latter also joining all the cages 14 together into the battery and maintaining them in fixed spaced relationship. This battery of cages 14 is secured to the front vertical edges of the brackets 13 in any desired manner, not shown.

Piston-like floats 18, which may be made in any desirable manner and of any desired suitable material so that they may possess the proper buoyancy and strength, are slidably mounted in the cages 14, and a vertical axial rod, or piston rod, 19 is rigid therewith. A spider 20 is secured within the cage 14 near the upper end thereof, and has a vertical sleeve 21 through which the rod 19 passes, so that the sleeve 21 provides a guide for the rod.

Journals 22 supported in the opposed frame walls 11 have the ends of a shaft 23 supported therein. A plurality of spaced ratchet wheels 24 are keyed on the shaft 23, each between collars 25. Near one end of the shaft 23, a ratchet wheel 26, similar to the wheels 24, is also keyed to the shaft 23. Adjacent but spaced from each wheel 24, is a goose neck crank 27 having the lower end of its substantially upright arm provided with a flange or ring 28 surrounding the shaft 23 and by means of which the crank 27 is pivotally mounted on this shaft. The other arm of the goose neck crank extends forward and downward and at its end is provided with a bearing 29 in which the upper end of a connecting rod 30 is pivoted. The lower end of the connecting rod 30 is pivoted to the upper end of the piston rod 19 at 31, and the latter pivot may be a universal joint if desired.

On the end of an arm or pin 32 extending from the crank 27, a pawl 33 is pivotally mounted so that its extremity falls by gravity into engagement with the ratchet wheel 24. A lug 34 secured against the side of the crank 27 forms the base of a spring 35 which presses down upon the pawl 33 to assure engagement of the pawl with the ratchet wheel teeth. A bell crank lever 36 is pivoted on the end of a bracket 37, one arm thereof forming the handle 38 and the other having a pin 39 projecting at right angles to extend under the pawl 33. It is apparent that swinging of the bell crank 36 in a counter-clockwise direction (Fig. 5) will lift the pawl 33 out of engagement with the ratchet 24. An indent 40 is provided in the lower edge of the pawl 33 substantially nearer the pivoted end thereof, for the pin 39 to register in to releasably hold the pawl in disengaged or elevated position clear of the ratchet. Of course any other suitable means might instead be provided for the latter purpose.

It is apparent from the above that as each float 18 is lifted by the wave or tide, the crank 27 is caused to turn clockwise (Fig. 5) and thereby to turn the ratchet 24 synchronously therewith and, with descent of the float the pawl 33 will slide loosely past the teeth of the ratchet; and each fractional rotation of the ratchets 24 will similarly rotate the shaft 23, since, as stated, the ratchets 24 are all keyed to this shaft.

The ratchet wheel 26 has a gear 43 fixed or integral against one side thereof, which is geared to a pinion 44 rigid on a shaft 45 supported in journals 46. The shaft 45 has a gear 47 thereon engaging a pinion 48 on a shaft 49 supported in journals 50. The shaft 49 has a gear 51 engaging a pinion 52 on a shaft 53 supported in journals 54. Intermittent power could of course be taken off the shaft 49 or gear 51. However, to enable the taking off of constant, governed power, a governor is provided as set forth below, although any other suitable governor might be provided in place of that illustrated.

A fly wheel 55 is axially aligned with the shaft 53 is provided with a hub, boss or collar 56 thereon; a similar boss 57 is provided on the pinion 52. Four quadrantially spaced arms 58 are hinged on pins 59 to the boss 56; similarly, identical arms 60 are hinged to the boss 57. The mutually adjacent ends of each pair of arms 58 and 60 are in the same manner hingedly connected to pins 62 anchored in weighted members or balls 61. The fly wheel 55 has a second boss 63 extending from the other side thereof. A brake drum or wheel 68 is rigid on the shaft 53 and has a hub 64 normally loosely contacting the boss 63 of the fly wheel. For a portion of its length, that is, between the hub 64 and the collar 56, the shaft 53 is square in cross-section, as shown at 67, and the fly wheel and its collar 63 are similarly or complementarily provided with a square socket, whence the fly wheel may move to the left along the shaft 53. Of course any other suitable construction to enable such movement of the fly wheel could be substituted for the square shaft and socket arrangement shown.

A simple lever 65 is fulcrumed at 66 and has a nose 69 urged into engagement against the surface of the fly wheel 68. The lever 65 has its lower end slotted vertically and forked to embrace a rod 70 having diametrically opposed pins 71 (of which but one is shown, Fig. 1) registering in the vertical slot 72. The rod 70 is slidably mounted in a sleeve 73 secured to the frame, not shown. A coiled spring 74 has one end anchored in a lug 75 secured to the frame, not shown, and the other end is secured to the rod 70, so as normally to urge the rod 70 to the left and hence the lever nose 69 against the fly wheel. At 76 is shown a coupling nut, turnbuckle, or the like, where the rod 70 may be broken and thereby the two parts joined in a manner to permit adjustment of the length thereof. A bell crank 77 is pivotally mounted at 78 on the frame, not shown, and one arm 79 thereof extends toward the rod 70 at substantially right angles to the latter and is pivoted at 80 thereto. The other arm 81 is pivoted to a rod 82 extending substantially horizontally.

A boss 84 extends from one side of the brake wheel 68 and provides the braking surface on which a flexible or band brake 85 is trained peripherally. The ends of the brake band 85 are clamped in fingers 86 and 87. A standard pony brake linkage shown generally at 88 joins the fingers 86 and 87 to the rod 83. It is apparent from Fig. 7 that when the rod 82 is pulled to the right, the band 85 will tighten on the drum 84 and thus slow down the shaft 53, and when moved to the left it will permit the shaft 53 to increase its speed.

A gear 89 is also rigid on the shaft 53, from which power may thus be taken off at constant speed. As one example of such power, a generator 90 has its pinion 91 engaged with the gear 89 and is delivering current through the leads 92 to a storage battery 93.

Provision is also made to store the energy generated by the rise of the floats 18 instead of taking it off simultaneously from the gear 89. This is accomplished through the means of a spiral spring 94 contained in a housing 95 having at one side thereof the gear 43 and at the other side thereof the ratchet 96 which is rotatably mounted on the shaft 23. One end of the spring 94 is anchored to the shaft 23 and the other end to the ratchet 96. The arm 32 of that pawl 33 nearest the housing 95 is extended to the other side of the housing and on its extension 32a a pawl 33a identical with the pawls 33 and their associated parts as described including the bell crank 36a, are provided for the ratchet 96, the bell crank 36a being supported on an arm or bracket 97 secured to the frame wall 11. A second pawl 98 is positioned peripherally spaced from the pawl 33a and supported on a bracket 41 secured to the wall 10.

The pawl 98 is shown as a double toothed type, pivoted at its middle to the arm 99 of a lever 42 which is pivotally secured to the bracket 41 and has a handle 100. A flat spring 101 secured to the bracket 41 presses against the arm 99 and thus normally urges the pawl into engagement with the ratchet 96. Any suitable means may be provided for holding the pawl 98 in disengaged position, but the means illustrated comprises a pin or peg 102 slidable in a recess 103 in the bracket 41 and urged toward and protruding outward from the recess by a spring 104. When the handle 100 is moved from the position shown in Fig. 6 wherein the pawl 98 engages the ratchet 96, in a counter-clockwise direction, it will depress and ride over the peg 102, and when it has passed the peg into a position (not shown) with the peg on the opposite side of the handle, the pawl will be releasably locked in disengaged position; for reengagement the movement of the handle is reversed. When it is desired to have the power delivered by the shaft 23 stored in the spring 94, the pawl 33a is lifted out of engagement with the ratchet 96 by the handle 36a and the pawl 98 is set in the engaging position shown in Fig. 6. Then the shaft 23 rotates the gear 43 in a clockwise direction (Fig. 6) and winds up the spring 94 since the ratchet 96 is held against rotation. When it is desired to utilize the stored energy of the spring 94 to act upon a load on the shaft 53, the pawls 33 are simply disengaged from their ratchets while the pawl 98 remains in engagement with the ratchet 96.

When the rotation of the shaft 23 by the action of the floats 18 is desired to be applied directly to a load without storing energy in the spring 94, the pawl 98 is disengaged and the pawl 36 is engaged. When the load on the shaft 53 is a light one, as would be the case of charging a storage battery as illustrated, excess energy delivered by the shaft 23 could be simultaneously stored in the spring 94 by engaging the pawl 98 and disengaging the pawl 33a.

In the disclosure of this invention no attempt has been made to illustrate the various gears, ratchets, shafts, and associated parts in their best proportions or ratios to accomplish efficient power delivery by the floats 18 to the load, and it is of course understood that modifications in form and structure may be made without departing from the spirit and scope of the invention.

I claim:

1. A machine comprising a horizontal shaft, a plurality of substantially vertical cages having floats slidably mounted therein, ratchets on said shaft, piston rods extending upward from said floats, cranks pivotally mounted on said shaft adjacent said ratchets, links or the like connecting said cranks with said piston rods, pawl means normally urged into engagement with said ratchets mounted on said cranks for causing rotation of said ratchets and shaft upon upward movement of said floats, means for disengaging said pawl means from said ratchets and having additional means for retaining said pawl means in disengaged position, and gears or the like connected with said shaft for taking power from said shaft, a power spring wound about said first shaft, and means for winding up said spring upon rotation of said first shaft.

2. A machine comprising a horizontal shaft, a plurality of substantially vertical cages having floats slidably mounted therein, ratchets on said shaft, piston rods extending upward from said floats, cranks pivotally mounted on said shaft adjacent said ratchets, links connecting said cranks with said piston rods, pawl means normally urged into engagement with said ratchets mounted on said cranks for causing rotation of said ratchets and shaft upon upward movement of said floats, means for disengaging said pawl means from said ratchets and having additional means for retaining said pawl means in disengaged position, and gears or the like connected with said shaft for taking off power from said shaft, a gear rigid with one of a pair of ratchets of said plurality of ratchets and positioned between said pair of ratchets, a power spring having one end secured to said first shaft and the other end secured to the other of said ratchets of said pair of ratchets, said last-named ratchet having an additional pawl normally urged into engagement therewith, means for disengaging said last-named pawl from said last-named ratchet and additional means for maintaining said last-named pawl in disengaged position.

3. A machine comprising a horizontal shaft, a plurality of substantially vertical cages having floats slidably mounted therein, means connecting said floats and said shaft for imparting rotary motion to said shaft upon rising of said floats, a spiral spring adapted to have energy stored therein upon winding up thereof, and means connecting said spring with said shaft for winding up said spring upon said rotation of said shaft.

4. The machine set forth in claim 3, having means for disconnecting said engaging means between said floats and said shaft to permit rotation of said shaft by said spring.

JAMES H. CRUMBLE.